United States Patent Office 3,552,109
Patented Jan. 5, 1971

3,552,109
BALERS
Patrick Anthony Molteno Murray, Painswick Lodge, and David Craig, Dell Farm, both of Painswick, Gloucestershire, England
Filed Aug. 22, 1968, Ser. No. 754,694
Claims priority, application Great Britain, Aug. 25, 1967, 39,269/67
Int. Cl. A01d 39/00, 43/02, 75/00
U.S. Cl. 56—343                                        11 Claims

ABSTRACT OF THE DISCLOSURE

A pick-up baler which, as it travels over a field, automatically picks up a crop, such as straw or hay, and delivers it in small bundles at the bottom of the front end of a chamber, which is the size of each bale to be formed. The bundles are delivered by circulating packing fingers and accumulate in loops of twine that are expanded by the increasing quantity of crop in the chamber, the crop gradually being compressed by a reciprocating packing plate mounted to undergo a comparatively short stroke at the front of the chamber. When the chamber is full, the twines are tied round the bale by knotting mechanism including needles mounted to traverse only a short distance relatively to the size of the front face of the bale. As the needles return to their inoperative positions, they cause the unlatching of a tail gate through which the completed bale is discharged on to the ground.

---

This invention relates to pick-up balers and an object of the invention is to provide a baler capable of making large size tied or bound bales suitable for handling, for example, by a gripping device on a tractor. Merely to enlarge known forms of balers that produce bales intended for man handling, would lead to impracticable and cumbersome machines, too big, too heavy and needing too much power.

A further object of the invention is, therefore, to reduce the amount of power required, in relation to the size of the bale, by keeping the demand for power reasonably uniform, by forming the bale in the direction of movement of the baler as a whole, by eliminating cross-packing and by dispensing with the need for a shearing ram. Yet another object is to provide mechanism that will spread the material (i.e., hay or straw) reasonably evenly on the front face of a large bale as it is formed.

Research has shown that when once the material necessary for a large bale has been accumulated, in order to convert this into a medium density bale, a compression pressure of about 600 pounds per square foot is necessary. This involves massive compressing mechanism and intermittent operation and it is an aim of the present invention to avoid these disadvantages.

Moreover, the use of conventional knotting arrangements for completing the binding or tying of the bale would involve the use of needles arranged to traverse an entire face of a large bale. This would involve the use of cumbersome needles with a low cycle time and it is an advantage of the invention that this is avoided.

According to the invention, a pick-up baler includes a bale chamber approximately the size of each bale to be formed, pick-up means for picking up hay or like crops automatically from the ground as the baler is towed or driven over the ground, means for forcing the material so picked up in comparatively small volumes at a time into the chamber so as gradually to build up a compressed bale in the chamber, and means for binding the formed bale while in the chamber and for discharging the bale from the chamber while the baler is travelling.

The baler may be towed by a tractor with a power take-off for driving the baler mechanism, or the baler may form part of a self-propelled vehicle. The means for forcing the material into the bale chamber may advantageously include circulating packing fingers arranged to push the material along an upward inclined path into the bale chamber.

An important feature applicable to the invention consists in mounting at the front of the bale chamber a packing plate that undergoes a short stroke, in timed relation to the circulation of the packing fingers so as to apply intermittent additional pressure to the front of the bale. The bale chamber is preferably provided with a tail gate, which is kept closed while the bale is being formed, but is automatically opened to allow the formed and bound bale to slide out.

Conventional, knotting mechanism may be used to secure the twines (which may be of sisal, plastic or wire) about the bales, but an important feature of the invention, believed to be new in itself, consists in arranging the needles to pass across the narrow entrance to the bale chamber instead of across the entire face of the bale as in a conventional baler. Conveniently, a trip for the tail gate is linked to the knotting mechanism, so that the gate opens after the knots have been made.

While the shape of the bale chamber is that of each individual bale when formed, it is possible to vary the sizes of the bales produced, simply by adapting the baler to different alternative sizes of bale chamber, without making any adjustment or replacement in the mechanism.

In order that the invention may be clearly understood and readily carried into effect a baler in accordance therewith will now be described, by way of example, with reference to the accompanying drawings, in which.

The chamber in which the bales are formed is within a rectangular container having its front, top, bottom and sides composed of spaced wooden boards 1 fixed in a metal framework 2. During the formation of a bale, the back of the chamber is closed by a tail gate 3, also composed of spaced wooden boards in a metal frame, hinged about a horizontal axis above the container on co-axial pivots 4. The front of the chamber is defined by a packing plate 6 composed of upstanding boards fixed in a metal frame. The packing plate 6 is mounted for to-and-fro movement through a short stroke just behind the front of the container. In use the baler is towed behind a tractor by means of a tow bar 7 fixed to an extension framework 5 of the container, which is mounted on wheels 8. The attitude of the baler, when being towed, is such that the bale chamber is inclined downwards to the rear so that gravity can assist the other factors described below that bring about the discharge of each bale at the back when formed.

Figure 1:
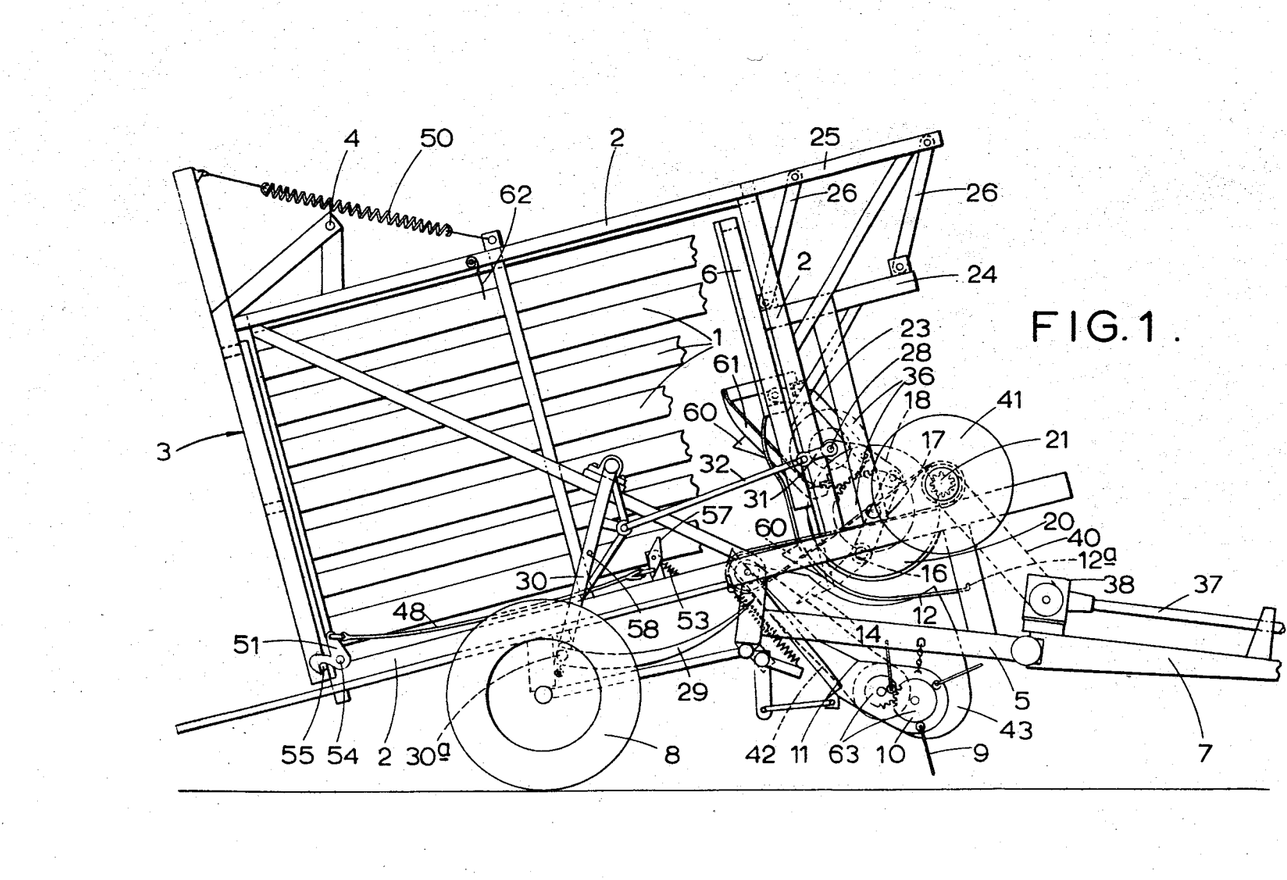
FIG. 1 is a side elevation of the baler, with some parts shown broken away to expose the interior.
Figure 3:
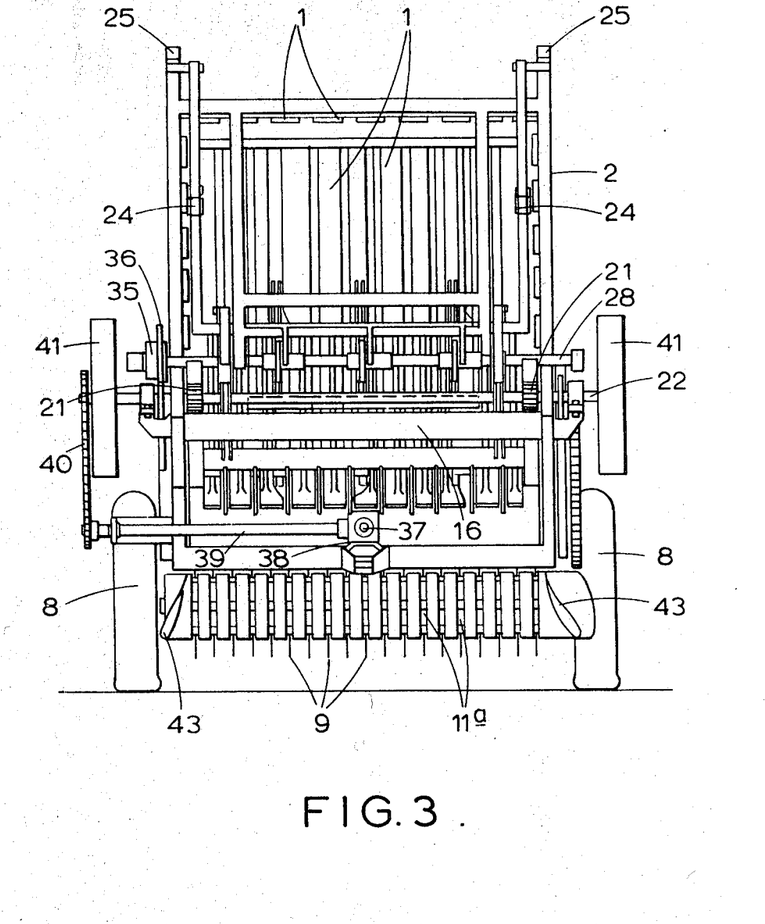
FIG. 3 is a front elevation of the baler.
Figure 4:
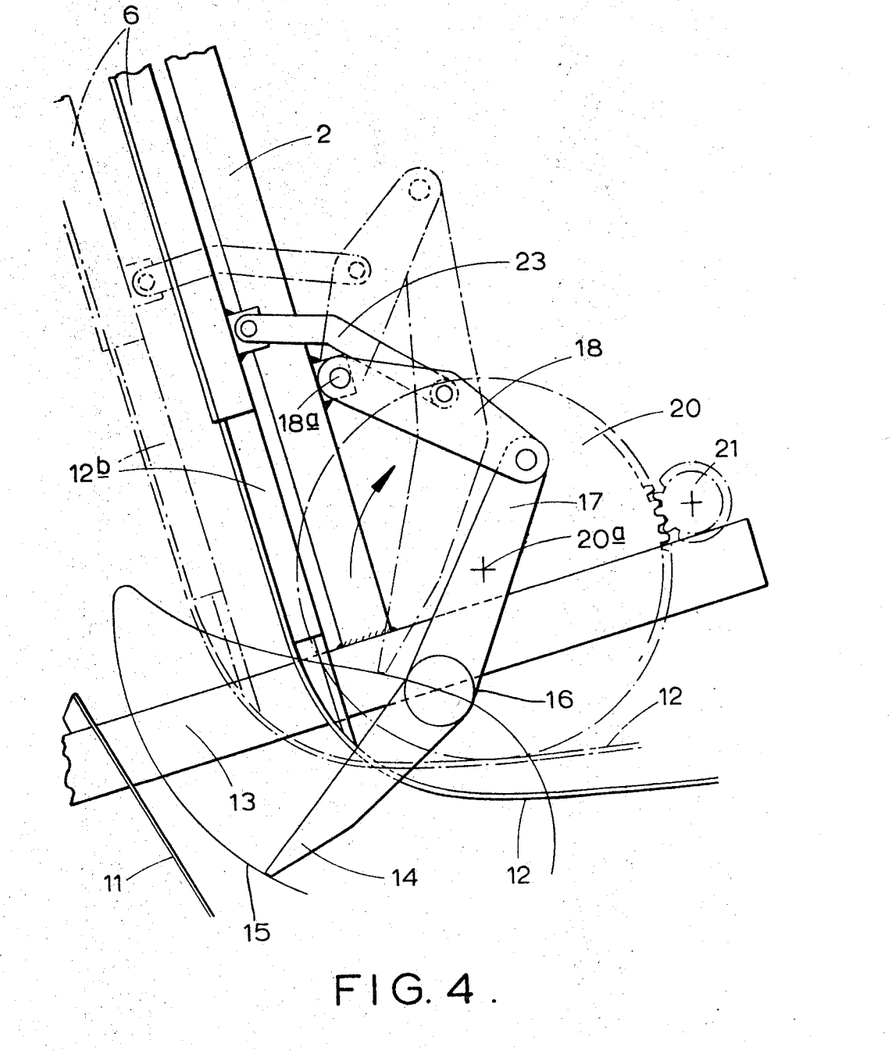
FIG. 4 is an elevation of some details of the baler on an enlarged scale.

As the baler is towed along, the crop, such as hay or straw, is picked up by the tines 9 pivoted to a pick-up reel 10, which is continuously driven by mechanism described below. The tines 9 deliver the hay into a duct defined beneath by a curved panel 11 (FIGS. 5 to 10) and above by flexible curved guide strips 12 curving downwards and forwards from the lower edge of the packing plate 6. The panel 11 is curved round at the front and formed with slots 11a (FIG. 3) through which the tines 9 pass. The forward edges of the flexible strips 12 are joined together at a horizontal axis 12a (FIG. 1) but are not connected to the framework 5. Their vertical portions are backed by fingers 12b (FIG. 4) extending down from the packing plate 6. In fact, the upper portions of the strips 12 and the fingers 12b may be regarded as forming portions of the packing plate. The duct defined between the plate 11 and strips 12 leads into the front of the chamber through a narrow transverse opening 13 in the floor. The material is fed in discrete bundles along the duct by a series of packing fingers 14, the lower tips of which transverse a curve 15 (FIG. 4). Thus, the packing fingers 14 pass downwards between the guide strips 12 and then upwards along the duct and through the opening 13. After forcing a bundle of material into the bale chamber, the fingers rise out of the duct and travel forward to the initial position. The crop is, therefore, driven directly upwards and backwards into the bale chamber in the direction of travel of the baler, no cross feed being necessary, the actual packing action within the chamber being described in detail below. In FIG. 4, a packing finger is shown in an inner position and by broken lines in an outer position.

Figure 2:
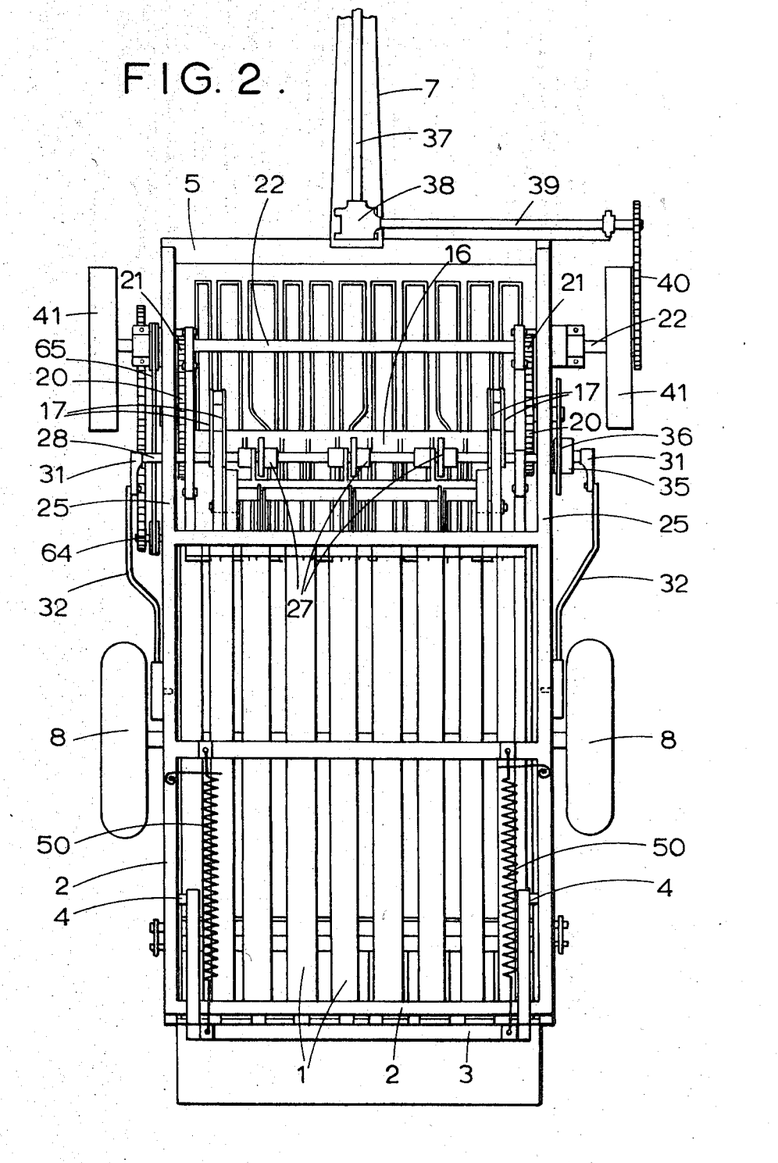
FIG. 2 is a plan of the baler.

The packing fingers 14 are distributed substantially along the entire width (four feet, nine inches) of the bale chamber on a single shaft 16, the bale chamber being only slightly narrower than the width of the pick-up reel 10 which is five feet wide. The packing fingers 14 have two pairs of upwardly extending arms 17 (FIGS. 2 and 4) pivoted to two beams 18 which, in turn, are pivoted about a fixed axis 18a to the framework 2. The power necessary to drive the fingers 14 along the curve 15 is transmitted through bearings in gearwheels 20 that carry the shaft 16. The gearwheels 20 rotate about a fixed axis 20a (FIG. 4) on the main framework and are driven by gears 21 on a shaft 22.

The packing plate 6 moves backwards and forwards and slightly upwards a few inches, acting on the bale in the way described below. The movement is imparted to the packing plate 6 by links 23 pivoted at opposite ends respectively to the packing plate 6 and to the links 18. The packing plate 6, on opposite sides, carries two rigid arms 24 extending forward through the front of the container beneath arms 25 rigid with the top of the bale chamber (FIG. 1), each arm 24 being suspended from the associated arm 25 by parallel links 26 so as to provide a parallelogram linkage which controls the path of movement of the packing plate 6, keeping the packing plate 6 parallel to the tail gate 3.

Figure 5:
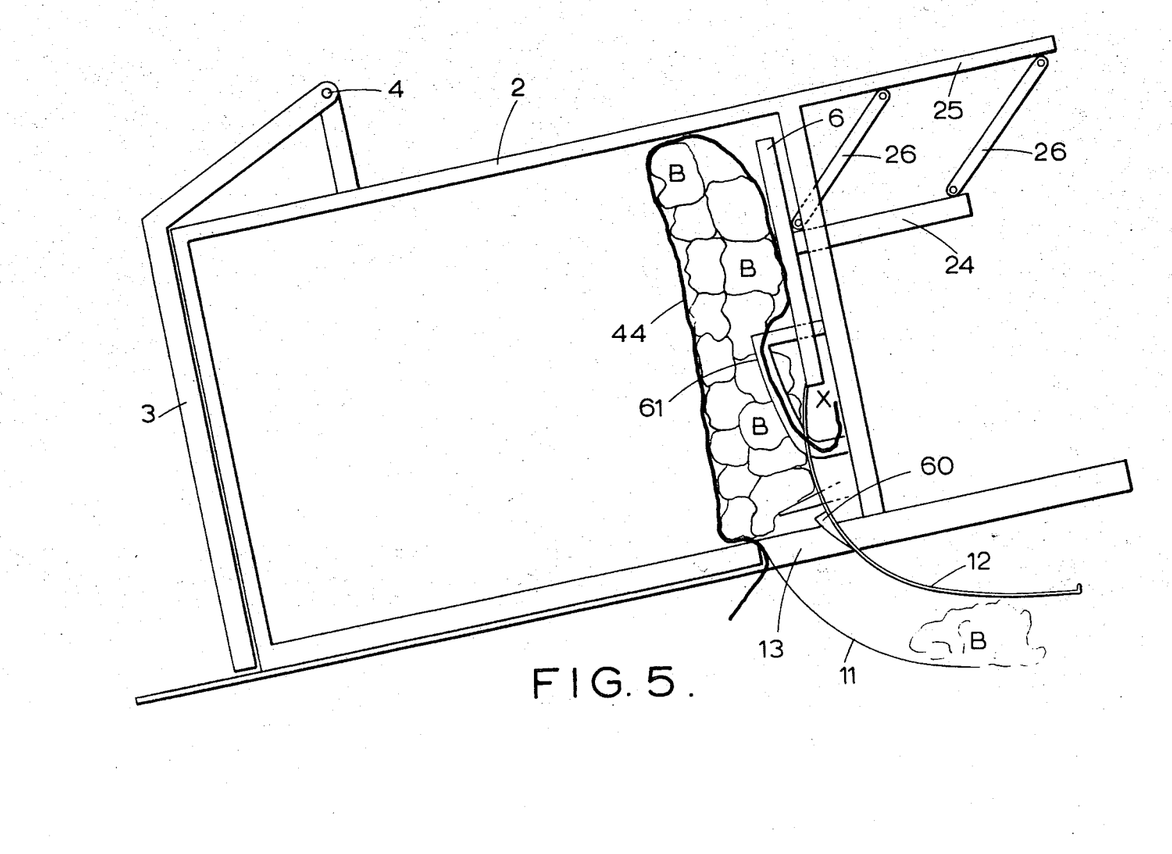
FIGS. 5, 6 and 7 are diagrammatic elevations respectively showing three stages in the formation of bales in the baler.

It will be seen that the material is fed into the bale chamber in a series of long, thin, compressed bundles, there being no shearing of the material, and passes through the narrow opening 13, the full width of the chamber, beneath the guide strips 12. The sides of the duct between the panel 11 and strips 12 are closed by plates 43. Across this narrow entrance at the rear of the duct and at the front of the bale chamber are three twines 44, which may advantageously be of polypropylene and which become looped round the bale as it is formed, the loops being enlarged by the bale as it becomes bigger and bigger. The twines are finally knotted to provide three parallel bands round the bale. As the material is pushed back to the rear of the chamber, the twines 44 pay out around the bundles of material as indicated in FIGS. 5 and 6.

The small bundles B (FIGS. 5 to 7) become compressed more and more as they are driven into the bale chamber against the increasing reaction of the material accumulating in the bale chamber. Assuming that there is already a substantial weight of material in the chamber, the packing plate 6 presses the material backwards towards the tail gate 3 with a small upward component, while the packing fingers 14 recede, the plate 6 and fingers 14 reaching the broken line positions at FIG. 4. The packing plate 6 then moves forwards to enable the packing fingers 14 to thrust a further bundle B into the chamber. These bundles move up the face of the packing plate 6 until they reach the top of the container, whereupon the further action of the packing plate 6 and packing fingers 14 causes the next lot of bundles to rise up the face of the packing plate 6 (including, of course, the upper portions of the strips 12). In this way the filling and compression of the bale in the chamber does not involve any excessive fluctuation in the power requirement, only small portions of the bale being fed in at a time but at a fairly high frequency. The short stroke of the packing plate exerts considerable pressure and it then moves back only sufficiently to allow the next bundle B to move up its face. There is but little tendency for the bundle to fall back, this being in part due to saw-tooth shaped plates 60 fixed to the strips 12.

Figure 7:
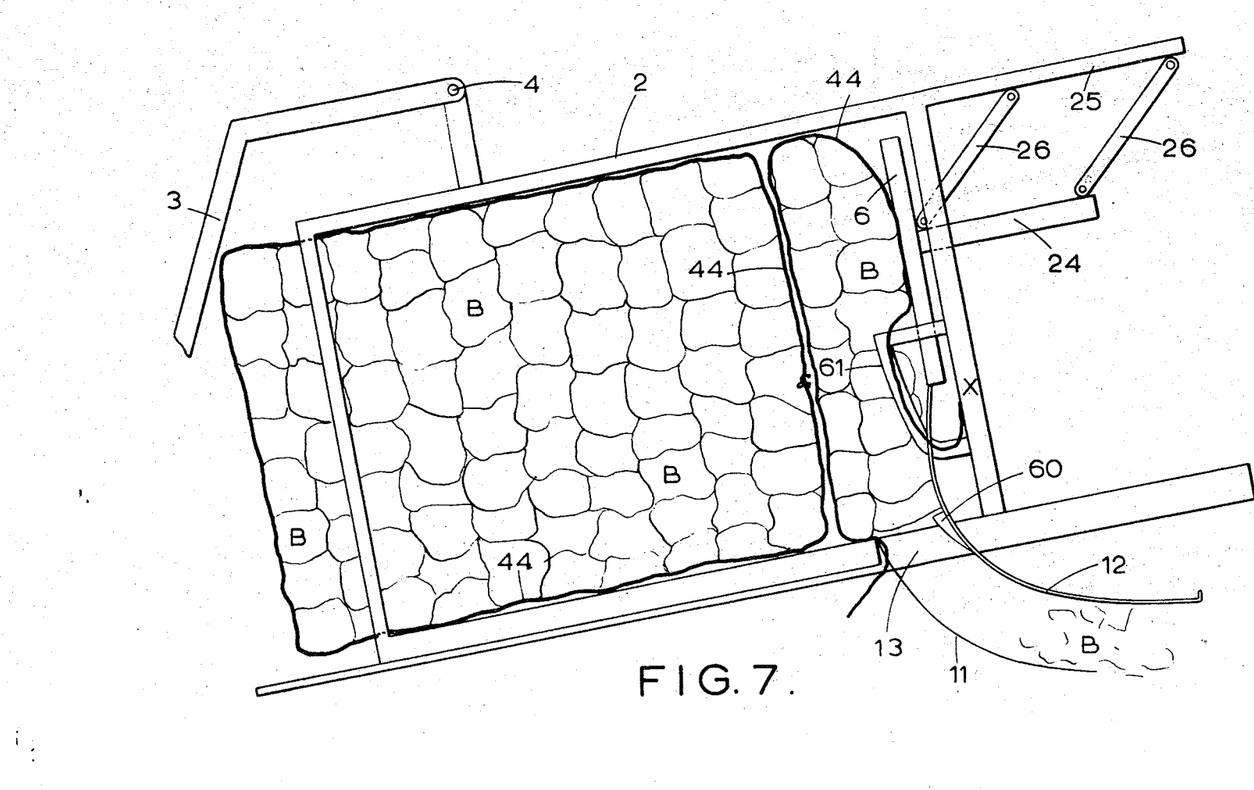
Figure 8:
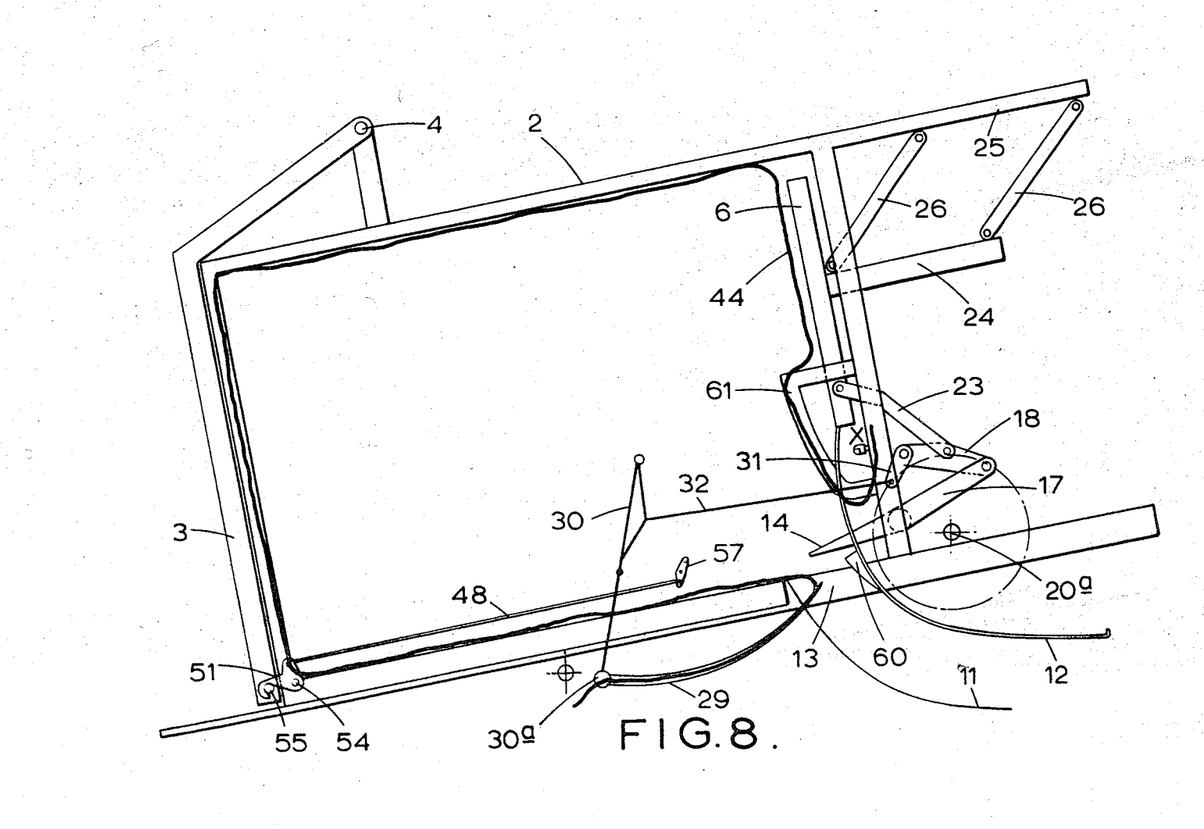
FIGS. 8, 9 and 10 are diagrammatic elevations respectively showing three stages in the binding of bales in the baler.
Figure 9:
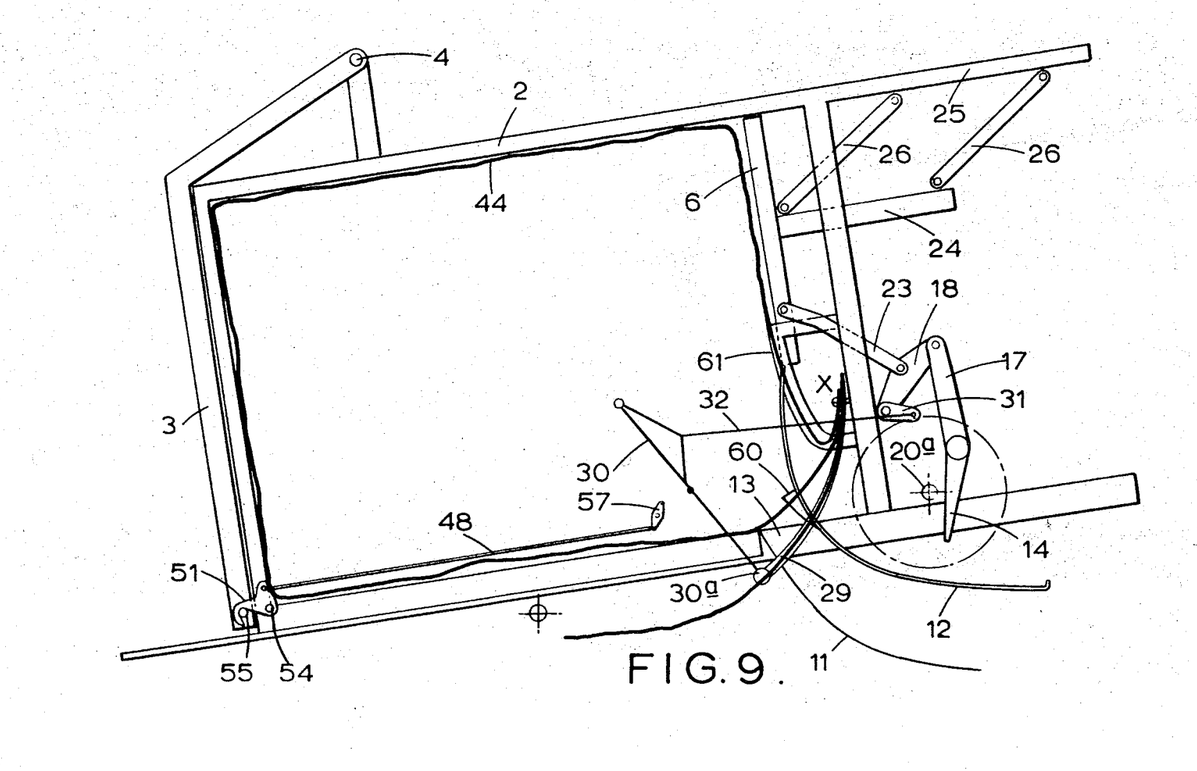
Figure 10:
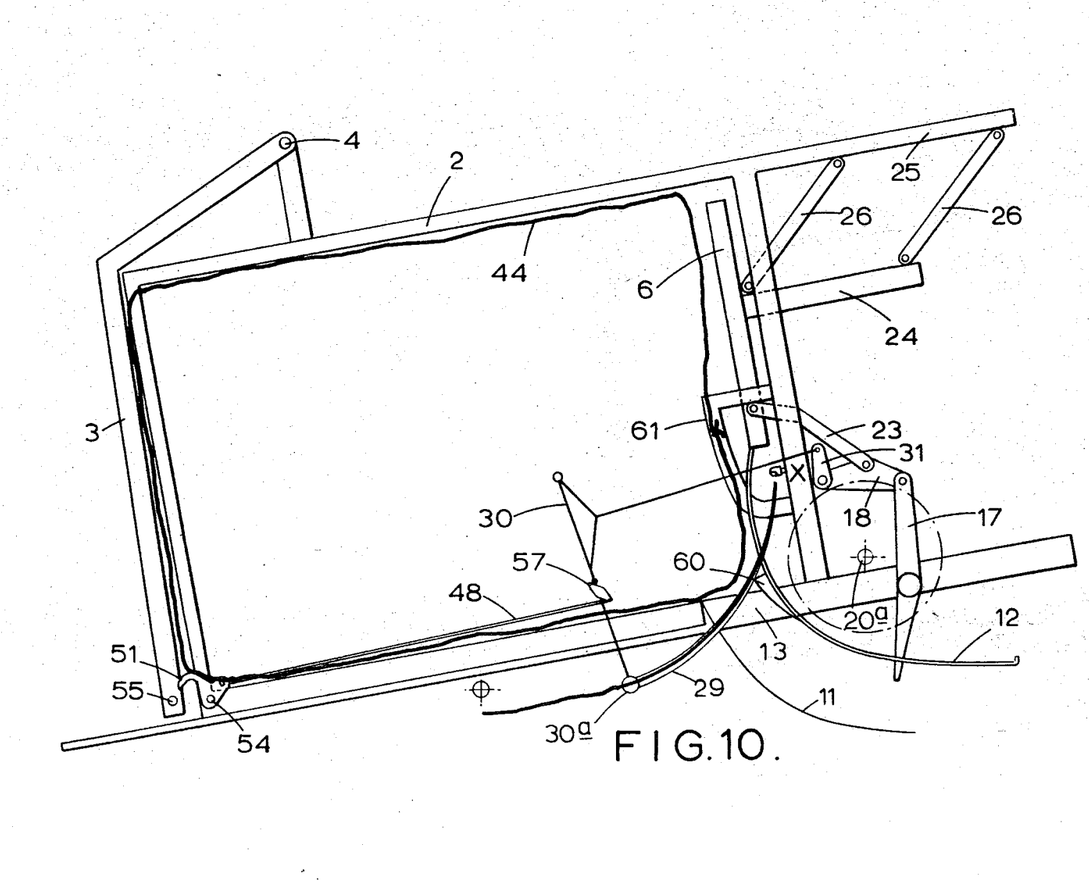

When a new bale is being started, this action is assisted by the pressure of the previously formed bale behind it, as shown in FIG. 7. However, even when there is no such fully formed bale, as will occur at the beginning of a baling operation, the same action tends to take place as a result of some tension in the twines 44. As shown in FIG. 5, each such twine 44 extends from a knotter unit (described below) located at X and then upwards over a twine guide 61 fixed to the container frame 2 and projecting through the packing plate 6. The twine passes through a channel shaped track in this guide 61 and then over the bundles B and through the opening 13 and through a knotting needle 29 described below to a twine supply box (not shown). The function of the guides 61 is to prevent the reciprocation of the packing plate 6 from fraying the twines.

Figure 6:
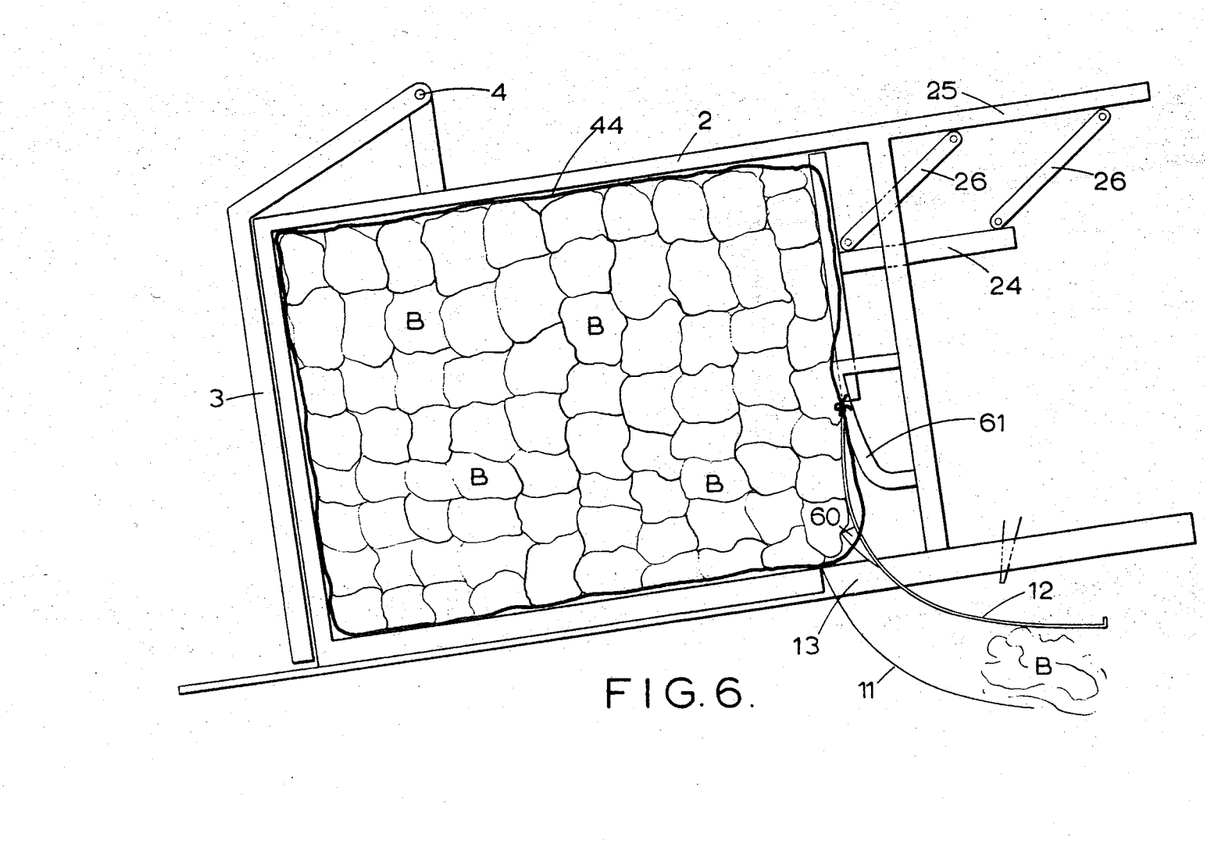

When the twines 44 have been expanded to the full size of the chamber as shown in FIG. 6, their ends are knotted together and the tail gate 3 is unlatched enabling the bale to be discharged under action of the formation of a new bale in front of it (FIG. 7), helped by the slope of the container and ultimately by the friction between the corner of the bale and the ground.

The location X, referred to above, is that of the axis of a shaft 28 (FIGS. 1 to 3) on which the three knotter units 27, respectively for the three twines 44, are mounted. The three associated knotting needles 29 are carried by a bar 30a extending between needle arms 30 oscillated at appropriate times by cranks 31 on the shaft 28, the cranks 31 being connected to the arms 30 by links 32. Trip mechanism 35 is located on the shaft 28 and is connected to a gear train 36 that operates continuously while the baler is in action. The trip mechanism 35 is of a type known in itself and may consist of a single revolution clutch that is actuated automatically when a feeler at the front of the bale chamber senses that the pressure in the bale chamber has reached a predetermined value, or manually by the tractor driver noting that the mechanism is fully loaded. As soon as the trip mechanism 35 operates, the needles 29 follow an upward and forward path, from the position of FIGS. 1 and 8, across the narrow opening 13 through which the material is fed into the bale chamber, until they encounter the knotting mechanism 27 at X (FIG. 9) which completes the loops about the bale, makes the knot and severs the twines, leaving the free end of the twine at the location X (FIG. 10) in the grip of the knotter unit. The needles 29 then recede to their lowermost positions, with the needle eyes sliding along the twines. The needles are raised and lowered while the packing fingers 14 are withdrawn and the packing plate 6 is pushing the bale backwards to keep it clear of the needles 29. Thereupon, one of the needle arms 30, on returning, causes the tail gate 3 to be unlatched so that the formed bale can be discharged as described above. The removal of the bale leaves the new bale being formed without any backing so that spring loaded tines 62 (FIG. 1) are provided to prevent the rear of the half formed bale from collapsing and causing the back end of the bale to be rounded or badly shaped. The action of the tines 62 is assisted by the twines. When the bale has been discharged, the tail gate 3 swings back to its closed position in which it is automatically latched.

The mechanism by which the tail gate is automatically unlatched and latched will now be described. For this purpose the needle arms 30 are furnished with pegs 58 which brush over the tops of two-armed levers 57 (FIG. 1), turning them clockwise when the needles are rising to the knotting position. Springs 53 return the levers 57 to neutral position when the pegs 58 have passed. On the return stroke, after the knots have been formed, the pegs 58 swing the levers 57 counter-clockwise so that they pull cables 48 to turn latches 51 about pivots 54 to release pins 55 on the tail gate, thus allowing springs 50 to turn the tail gate 3 a little way about the axis 4. The bale can then be discharged, pushing the gate 3 wide open. After the bale has passed, gravity swings the tail gate back to the closed position, the momentum carrying it to the latched position.

The drive for the mechanism is taken from the tractor power take-off by way of a shaft 37, bevel gearing 38, a shaft 39 and a sprocket and chain drive 40 to the shaft 22 which carries flywheels 41. The pick-up reel 10 is driven by a sprocket and chain drive 42 and gearing 63 (FIG. 1) from a counter-shaft 64 (FIG. 2) driven by a belt 65 from the shaft 22.

Figure 11:
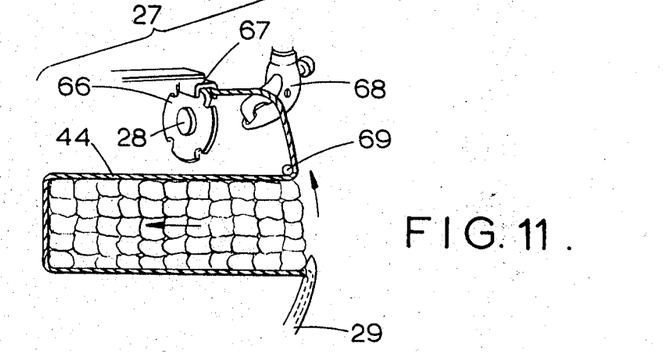
FIGS. 11 to 14 are perspective diagrams respectively showing four stages in the formation of a knot.
Figure 12:
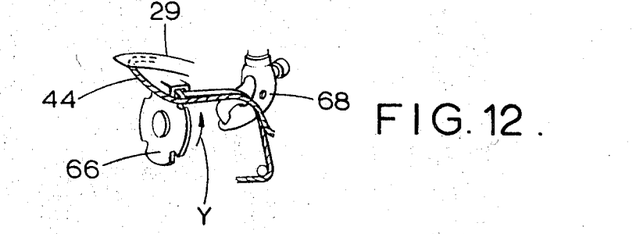
Figure 13:
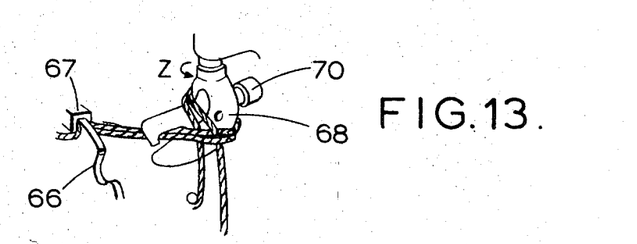
Figure 14:
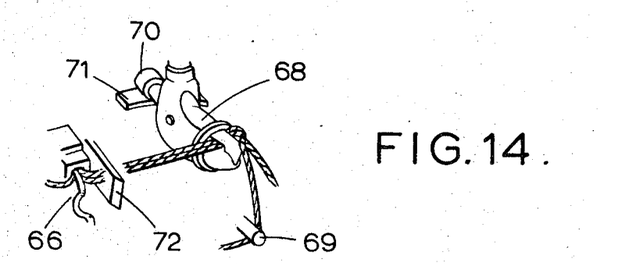

The knotting units may take a variety of forms and one such form is shown in FIGS. 11 to 14. It will be appreciated that these drawings are purely diagrammatic. In particular, while FIG. 11 shows the needle 29 arranged to traverse the entire front face of the bale, in the baler described above the needle only has to traverse a small portion of the bale face. Before the knot is made, the free end of the twine 44 is clamped between a rotary retainer 66 on the shaft 28 and a spring-loaded clamp 67. From this assembly the twine passes over bills 68 and a guide 69 and round the bale to the needle 29, thence to a tensioner at the twine box and a spool in the box. When the trip mechanism 35 has been operated, the needle 29 passes across the bills 68, as shown in FIG. 12, placing the twine in a notch in the rotary retainer 66, which revolves in the direction of the arrow Y so as to hold both lengths over the bills 68. The bills are then caused to revolve in the direction of the arrow Z in FIG. 13, the drive being obtained from the shaft 28, and the bills are opened by cam action on a roller 70. The bills are then closed by a cam 71 acting on the roller 70. Finally the taut, adjacent lengths of twine are severed by a knife 72 and the bale pulls the formed knot off the bills.

We claim:
1. A pick-up baler for crops such as hay comprising
   (a) a bale chamber, the bale chamber being approximately the size of each bale to be formed and substantially determining the overall size of the baler, said bale chamber including an entry duct and an entry slot located at the bottom of the forward end of the bale chamber;
   (b) pick-up means for continuously picking up the material to be baled into the entry duct;
   (c) packing finger means for travering a curved path through the entry duct and the entry slot so as to successively feed discrete volumes of the material in the entry duct through the entry slot into the bale chamber;
   (d) a packing plate, forming the forward end of the bale chamber, reciprocally movable in synchronism with the movement of the packing finger means;
   (e) binding means for binding the formed bale while in the chamber; and
   (f) discharge means for discharging each bale as formed from the rear of the chamber while the baler is traveling.

2. A pick-up baler as claimed in claim 1 wherein the pick-up means comprise a continuously driven pick-up reel and a plurality of tines pivoted to the pick-up reel.

3. A pick-up baler as claimed in claim 1, in which the packing finger means form part of a power driven linkage mechanism which also actuates the packing plate.

4. A pick-up baler as claimed in claim 1 further comprising driving and supporting means for the packing plate for imparting thereto a reciprocating movement having a small upward component of movement during the rearward travel of the plate.

5. A pick-up baler as claimed in claim 1, in which the packing plate includes a plurality of strips of material extending downwards through the inlet slot to form part of the inlet duct and curved so as to bound the top of the path along which the material is fed, the packing fingers projecting between the strips during their circulating movement.

6. A pick-up baler as claimed in claim 1, in which saw-tooth shaped members are mounted in the bale chamber in the path along which the material is fed to hinder any reverse movement of the material.

7. A pick-up baler as claimed in claim 1, further comprising a knotting mechanism for completing binding of a formed bale, said mechanism including knotter units mounted at the front of the bale chamber and oscillating needles mounted beneath the bale chamber movable to and from the knotter units and normally withdrawn to positions outside the bale chamber, the path of movement of each needle covering a distance that is substantially less than the distance between the opposite edges of the front of the bale chamber which lie transversely to the lines of movement of the needles.

8. A pick-up baler as claimed in claim 7, in which the knotter units are located in front of the packing plate and in which the needles rise, while the packing plate holds the material clear of the needles, to co-operate with the knotter units.

9. A pick-up baler as claimed in claim 8, in which fixed guides, projecting through the packing plate, are provided for preventing the packing plate from fraying the binding material.

10. A pick-up baler as claimed in claim 7, in which the chamber is closed at the back by a tail gate, said baler including a latch mechanism for latching said tail gate in a closed position, the needles, in receding from a knotting operation, actuating the latching mechanism so as to unlatch the tail gate.

11. A pick-up baler as claimed in claim 10 further comprising spring means for spring loading the tail gate so that the tail gate springs open a small amount when unlatched and is returned to the latched position after the passage of a bale.

References Cited
UNITED STATES PATENTS

| | | | |
|---|---|---|---|
| 2,349,847 | 5/1944 | Crumb | 56—341 |
| 2,839,981 | 6/1958 | Harstick et al. | 56—341 X |
| 2,909,887 | 10/1959 | Claas | 56—341 |
| 2,929,599 | 3/1960 | McClellan | 56—343X |
| 3,103,775 | 9/1963 | Evans et al. | 56—341 |
| 3,177,641 | 4/1965 | Powell et al. | 56—341 |

LOUIS G. MANCENE, Primary Examiner

J. N. ESKOWITZ, Assistant Examiner